United States Patent
Stangl et al.

(10) Patent No.: US 11,772,809 B2
(45) Date of Patent: Oct. 3, 2023

(54) FUSELAGE FOR AN AIRCRAFT WITH FUSELAGE-INTEGRATED TAILPLANE

(71) Applicant: Airbus Defence and Space GmbH, Taufkirchen (DE)

(72) Inventors: Wolfgang Stangl, Taufkirchen (DE); Robert Osterhuber, Taufkirchen (DE); Philipp Ernstberger, Taufkirchen (DE)

(73) Assignee: Airbus Defence and Space GmbH, Taufkirchen (DE)

( * ) Notice: Subject to any disclaimer, the term of this patent is extended or adjusted under 35 U.S.C. 154(b) by 4 days.

(21) Appl. No.: 17/535,995

(22) Filed: Nov. 27, 2021

(65) Prior Publication Data
US 2023/0166858 A1 Jun. 1, 2023

(51) Int. Cl.
*F02K 1/12* (2006.01)
*B64D 33/04* (2006.01)
(Continued)

(52) U.S. Cl.
CPC ............ *B64D 33/04* (2013.01); *B64C 1/16* (2013.01); *B64D 27/20* (2013.01); *B64D 29/04* (2013.01);
(Continued)

(58) Field of Classification Search
CPC .......... F02K 1/002; F02K 1/004; F02K 1/006; F02K 1/008; F02K 1/12; F02K 1/1215;
(Continued)

(56) References Cited

U.S. PATENT DOCUMENTS 2,625,008 A * 1/1953 Crook ................... F02K 1/1223
239/455
2,928,238 A * 3/1960 Hawkins, Jr. ............. B64C 9/38
239/536
(Continued)

FOREIGN PATENT DOCUMENTS

CA 827880 A 11/1969
DE 1531417 A 12/1967
(Continued)

OTHER PUBLICATIONS

Extended European Search Report for Application No. 21207682 dated Apr. 5, 2022.
(Continued)

*Primary Examiner* — Todd E Manahan
*Assistant Examiner* — Marc J Amar
(74) *Attorney, Agent, or Firm* — KDW Firm PLLC

(57) ABSTRACT

A fuselage for an aircraft. The fuselage has a control element with an integrated engine outlet. The control element is integrated at a rear end of the fuselage, so that the control element terminates flush with an outer skin of the fuselage in a circumferential direction of the fuselage. An outer wall of the control element surrounds the engine outlet wherein the engine outlet is directed towards an open rear side of the control element. The control element is connected to the fuselage such that the control element jointly the engine outlet is pivotable about a rotation axis with respect to the fuselage. The rotation axis runs transversely to a longitudinal direction of the fuselage and the control element functions as a tailplane when pivoting about the rotation axis.

9 Claims, 6 Drawing Sheets

(51) Int. Cl.
  *B64D 27/20* (2006.01)
  *B64D 29/04* (2006.01)
  *B64C 1/16* (2006.01)
  *F02K 1/00* (2006.01)
  *F02K 1/80* (2006.01)

(52) U.S. Cl.
  CPC ............. *F02K 1/002* (2013.01); *F02K 1/006* (2013.01); *F02K 1/1223* (2013.01); *F02K 1/80* (2013.01)

(58) Field of Classification Search
  CPC .......... F02K 1/1223; F02K 1/80; F02K 1/805; B64C 5/10; B64C 9/38; B64C 15/02; B64D 33/04
  See application file for complete search history.

(56) References Cited

U.S. PATENT DOCUMENTS

| | | | |
|---|---|---|---|
| 3,240,448 A | 3/1966 | Schaffer | |
| 3,884,435 A * | 5/1975 | Croy | B64C 15/02 244/46 |
| 3,926,389 A * | 12/1975 | Mederer | B64C 5/04 244/76 R |
| 4,361,281 A * | 11/1982 | Nash | B64D 33/04 239/265.37 |
| 4,363,445 A * | 12/1982 | Bouiller | F02K 1/008 267/152 |
| 4,508,270 A * | 4/1985 | Joubert | F02K 1/008 239/265.35 |
| 4,569,493 A * | 2/1986 | Burhans, Jr. | B64C 13/16 244/76 R |
| 4,763,840 A * | 8/1988 | Madden | F02K 1/1223 239/265.35 |
| 4,984,741 A * | 1/1991 | Nightingale | F02K 1/1292 239/265.17 |
| 5,150,839 A | 9/1992 | Reedy | |
| 6,067,793 A | 5/2000 | Urruela et al. | |
| 8,572,986 B2 | 11/2013 | Roberts et al. | |
| 10,443,539 B2 | 10/2019 | Baker | |
| 2002/0158146 A1* | 10/2002 | Lair | F02K 1/006 60/228 |
| 2007/0234728 A1* | 10/2007 | Peters | F02K 1/1223 239/265.19 |
| 2011/0271686 A1 | 11/2011 | Francisco et al. | |
| 2017/0145955 A1* | 5/2017 | Baker | F02K 1/1276 |
| 2018/0305007 A1* | 10/2018 | Evulet | B64D 27/18 |
| 2019/0017468 A1* | 1/2019 | Evulet | B64C 15/02 |
| 2020/0307789 A1* | 10/2020 | Princen | B64C 39/10 |
| 2020/0324890 A1* | 10/2020 | Evulet | B64C 29/0025 |
| 2020/0331589 A1* | 10/2020 | Cummings | B64D 29/02 |

FOREIGN PATENT DOCUMENTS

| | | |
|---|---|---|
| DE | 33 22 206 A1 | 1/1985 |
| DE | 696 27 713 T2 | 2/2004 |
| DE | 601 25 279 T2 | 5/2007 |
| JP | 60237147 A | 11/1985 |

OTHER PUBLICATIONS

Anonymous, "Exhaust Systems With Turbocharger (Part Two)," Feb. 23, 2017, pp. 1-9.
Anonymous, "Propelling Nozzle," Wikipedia, Feb. 11, 2021, pp. 1-10.

* cited by examiner

FUSELAGE FOR AN AIRCRAFT WITH FUSELAGE-INTEGRATED TAILPLANE

TECHNICAL FIELD

The description relates generally to the construction of an aircraft. In particular, the description relates to the construction of a fuselage with control elements adjoined thereto with integrated engine outlet. The fuselage is particularly suitable for use in jet aircraft and in particular supersonic aircraft such as military combat aircraft.

BACKGROUND

Jet engines have an engine outlet and are used to provide propulsive power for an aircraft. The engine outlets are usually located in the tail region of an aircraft.

Particularly in the military environment, aircraft are subject to a variety of requirements. These requirements range from an armament and equipment capability, to flight characteristics in order to be able to perform certain flight manoeuvres or mission profiles, to stealth characteristics in order to be camouflaged as far as possible against reconnaissance measures, in particular reconnaissance measures using electromagnetic waves such as those used by radar systems.

Depending on the wavelength range of the reconnaissance measures against which an aircraft is to be camouflaged or "invisible", the corresponding stealth measures must be designed differently. In general, however, it can be stated that in order for an aircraft to be invisible or difficult to detect against radar reconnaissance, incoming radar signals should be reflected away in such a way that all radar signals reflected back from the aircraft fall within narrow and selected angular ranges which are at a sufficiently large angle to the emitting radar. If this cannot be achieved, then those components on the aircraft must be structurally camouflaged with absorbers in such a way that they absorb the incoming radar signals and attenuate them as far as possible.

Design principles that meet these requirements include, amongst others, designing the aircraft so that its outer skin has edges that are as long as possible and so that the edges and surfaces run parallel to each other whenever possible. Thus, when radar signals are reflected from the outer skin of an aircraft, they are not widely scattered, but are reflected from the parallel surfaces in the same direction, reducing the likelihood of the radar signals reaching a corresponding receiver. In other words, the radar signals are only reflected back to the source when they impinge perpendicularly on the edges and surfaces, so that an aircraft can only be detected by radar reconnaissance in a very small angular range.

Based on these principles, certain regions of an aircraft are detrimental to its stealth against radar reconnaissance, namely regions with short edges, especially when the length of individual edges is close to the wavelength of radars, regions with single or multiple curved surfaces, and regions with multiple elements of which the edges are at different angles to each other.

While the wings and the front and side fuselage can be camouflaged relatively well against radar reconnaissance, the tail region with the engines and engine outlets as well as the control surfaces (vertical stabilizer, tailplane, etc.) pose a greater challenge because the engine outlets in particular, with their nozzle mechanism which allows cross-sectional adjustment, have a large number of curved surfaces and small elements with edges running in different directions, and these are difficult to camouflage even by absorbers because of the high temperatures prevailing there.

SUMMARY

It may be considered an object of the disclosure herein to describe a fuselage for an aircraft, in particular a jet aircraft, which comprises a reduced radar signature in the tail region.

This object is achieved with the subject matter disclosed herein.

Refinements result from the following description.

The object is achieved in particular in that the function of the tailplane and the engine outlets are combined in one assembly (this assembly is referred to as the control element in the remainder of the description). This assembly is pivotable with respect to the fuselage about a transverse axis so that the assembly fulfils the function of the tailplane. The engine outlets are integrated into the assembly. This achieves a number of advantages in terms of the camouflage against radar reconnaissance: the number of separate elements in the tail region of the fuselage is reduced and the engine outlets, which are generally difficult to camouflage against radar reconnaissance, are surrounded by the outer wall of the assembly and a direct line of sight to them is prevented from a large part of the viewing angles.

According to one aspect, a fuselage for an aircraft is described. The fuselage has a control element having an integral engine outlet. The control element is integrated at a rear end of the fuselage such that the control element terminates flush with an outer skin of the fuselage in a circumferential direction of the fuselage. An outer wall of the control element surrounds the engine outlet so that the engine outlet is directed towards an open rear side of the control element. The control element is connected to the fuselage such that the control element is pivotable together with the engine outlet about a rotation axis with respect to the fuselage, wherein the rotation axis runs transversely to a longitudinal direction of the fuselage and the control element functions as a tailplane when pivoting about the rotation axis.

The control element terminates flush with the fuselage in the circumferential direction, wherein the circumferential direction refers to the longitudinal axis of the fuselage and the circumferential direction runs transversely to the longitudinal axis. The control element thus represents an extension of the fuselage rearwardly.

The fuselage is understood in the present case to be the body of the aircraft, apart from control surfaces and wings. The fuselage transitions into the control element, and at the transition point the fuselage and control element have a mutually corresponding cross-section or a mutually corresponding shape. The width and height of the control element correspond to the width and height of the fuselage at the transition point from fuselage to control element.

The control element fulfils the function of a tailplane. The control element has surfaces that are of sufficient size to perform the function of a tailplane. Furthermore, the control element is sufficiently far from a centre of gravity of the fuselage or the aircraft as a whole to perform the function of a tailplane when pivoted upward or downward about the rotation axis from an initial position (generally the initial position is defined such that the engine outlet runs in a longitudinal direction of the fuselage). When the control element is pivoted out of the initial position, an upper surface or a lower surface of the control element exerts sufficient moment about a transverse axis of the fuselage to cause movement of the aircraft about the transverse axis during operation. The control element replaces a complete tailplane, which is usually provided separately from the engine, for example as control surfaces at the rear of the aircraft (either at the rear end of the fuselage or the wings) or in front of the wings (so-called duck wing or canard).

Because the engine outlets are integrated in the control element, the engine outlet is also pivoted when the control element is pivoted about the rotation axis with respect to the fuselage. Thus, the engine outlet functions as a thrust vectoring nozzle. Because the direction of the engine outlet is changed, this generates a higher moment about the transverse axis in addition to the surfaces of the control element.

The structure described here is particularly suitable for a jet engine. The engine outlet is understood in the present case to be a portion of the engine which extends in the longitudinal direction of the fuselage at least inside the control element. Portions of the engine outlet can also extend out of the control element into the fuselage. The engine outlet thus includes at least the rear outlet opening of the engine and further elements located in front of the outlet opening. The rear end of the engine outlet is preferably located in front of the rear edge of the outer wall of the control element or at most at the same level as the rear edge of the outer wall.

The fuselage can have a single engine or multiple engines, especially two engines. The engine outlets of all engines are surrounded by the outer wall of the control element. Thus, only one element is visible to the outside, which keeps the radar signature low.

In other words, the control element described here combines the function of aerodynamic control surfaces, in particular a tailplane, and of the engine outlet in one element which is integrated into the rear end of the fuselage, where it can be pivoted about a transverse axis to perform its intended function. The control element is adjoined flush to the fuselage. This design reduces the number of components at the rear of the fuselage, especially components with a significant radar signature or components that can only be camouflaged against radar reconnaissance with comparatively high effort. The outer wall of the control element frames the engine outlet, so that the number of edges in the rear region of the fuselage is reduced and the remaining edges visible from the outside are furthermore longer, so that the camouflage against radar reconnaissance is improved.

The control element is considered the primary and full control surface of the aircraft and is preferably controlled redundantly in all respects, i.e. at least two actuators are provided which cause the control element to move about its transverse axis with respect to the fuselage. The actuators exert a force on the control element preferably via independent and separate mechanisms, so that the control element can still be controlled and can perform its function as a tailplane even if an actuator and/or an associated mechanism fails. In contrast, in the case of a conventional round nozzle, the adjustment of the plates or blades forming the convergent and divergent nozzle is usually simple and non-redundant. The plates or blades forming the convergent and/or divergent nozzle portion are thus not a primary control surface of the aircraft.

According to one embodiment, the engine outlet is designed as a thrust vectoring nozzle.

The orientation of the engine outlet can be varied. This changes the thrust vector so that a corresponding moment is exerted on the fuselage during operation. The thrust vector nozzle thus supports the function of the control element in its task as a tailplane.

According to a further embodiment, the engine outlet has a convergent nozzle portion and a divergent nozzle portion arranged therebehind in the longitudinal direction.

The exhaust jet of the engine first flows through the convergent nozzle portion and then through the divergent nozzle portion. The divergent nozzle portion is located closer to the rear outlet opening of the engine than the convergent nozzle portion.

According to a further embodiment, the convergent nozzle portion has two control blades which are adjustable relative to each other so that a cross-section of the convergent nozzle portion is variable.

It is also conceivable that the convergent nozzle portion has more than two control blades in order to change the cross-section of the convergent nozzle portion. However, the preferred variant is designed with two control blades. For example, the two control blades are located laterally and opposite each other at the engine outlet and can be pivoted towards or away from each other. This changes a ratio of the cross-sections on the inlet side of the convergent nozzle portion and on the outlet side of the convergent nozzle portion.

According to a further embodiment, the divergent nozzle portion has two control blades, wherein the control blades of the divergent nozzle portion are adjustable relative to each other so that a cross-section of the divergent nozzle portion is variable, or wherein the control blades of the divergent nozzle portion are adjustable jointly so that a cross-section of the divergent nozzle portion remains the same and an outlet direction of the engine outlet is changed.

The divergent nozzle portion is generally adjusted depending on the ambient pressure and controls the pressure ratio between internal pressure and external pressure. The divergent nozzle portion is mostly adjusted to the flight altitude.

In the present context with an integration of the engine outlet into the control element, the convergent and divergent nozzle portions each consist of or comprise two pivotable control blades. If only two pivotable control blades are used, instead of multiple flaps as in a conventional round nozzle, the radar signature is additionally reduced.

The divergent nozzle portion, similarly to the convergent nozzle portion, may also have more than two control blades or preferably may have exactly two control blades. These two control blades can be moved so that a ratio of the cross-sections on the inlet side of the divergent nozzle portion and on the outlet side of the divergent nozzle portion changes. Alternatively, the control blades of the divergent nozzle portion can be moved so that this ratio of cross-sections on the inlet side and outlet side remains the same and the control blades are pivoted jointly in a lateral direction of the fuselage, thereby changing the outflow direction of the exhaust jet from the divergent nozzle portion laterally in order to cause a torque about the vertical axis of the aircraft, resulting in a so-called yawing motion. This can help to enhance the effect of a vertical stabilizer of the aircraft or to support the vertical stabilizer in its function.

According to a further embodiment, the cross-section of the convergent nozzle portion can be changed independently of the cross-section of the divergent nozzle portion.

When moving the control blades of the convergent nozzle portion, the control blades of the divergent nozzle portion can move such that the control blades of the divergent nozzle portion are moved towards or away from each other while maintaining their angle. For example, the control blades of the divergent nozzle portion are moved parallel towards or away from each other when the control blades of the convergent nozzle portion are moved.

According to a further embodiment, the control blades of the divergent nozzle portion are angled and each control blade of the divergent nozzle portion meets the outer wall of the control element at an angle different from 90°.

The control blades are not flat and level, but are shaped in the form of an obtuse angle, the contours of which correspond to the contours of the side surface of the control element. This avoids the formation of a so-called corner reflector inside the control element, thus further reducing the radar signature of the aircraft.

According to a further embodiment, a rear edge of the control blades of the divergent nozzle portion is serrated.

This embodiment swirls the air at the engine outlet, resulting in better mixing of the hot exhaust jet with the cooler ambient air and reducing a heat signature of the aircraft.

According to a further embodiment, the control element has a lateral nozzle cover on both sides, wherein each lateral nozzle cover is connected to a control blade of the divergent nozzle portion and is entrained by the control blade of the divergent nozzle portion when the control blade moves.

The lateral nozzle cover forms the lateral outer surface of the outer wall of the control element and closes a line of sight to the control blades of the convergent and divergent nozzle portions as well as to the mechanisms for moving the corresponding control blades.

According to a further embodiment, the engine outlet is double-walled at least in portions so that a cooling fluid can be guided through the double-walled portion.

Preferably, the engine outlet is double-walled between the engine and up to and including the convergent nozzle portion. This forms a cavity which surrounds the engine and the engine outlet. A cooling fluid, for example cool ambient air, can be passed through this cavity to cool the engine and the engine outlet as well as the associated components. At the transition from the convergent nozzle portion to the divergent nozzle portion, the cooling air exits the cavity and flows along the control blades of the divergent nozzle portion so that the control blades of the divergent nozzle portion are also cooled.

An aircraft equipped with a fuselage as described here has a low radar signature from various perspectives, more specifically not only from the front, but also from the side and also from the rear. Although the engine outlet is designed as a thrust vectoring nozzle, which requires multiple moving elements, the integration of the engine outlet into the control element keeps the radar signature low. The fuselage as described here can also be used in particular for supersonic combat aircraft.

BRIEF DESCRIPTION OF THE DRAWINGS

Further details are described with reference to the figures. The figures are schematic and not to scale.

DETAILED DESCRIPTION

Figure 1:
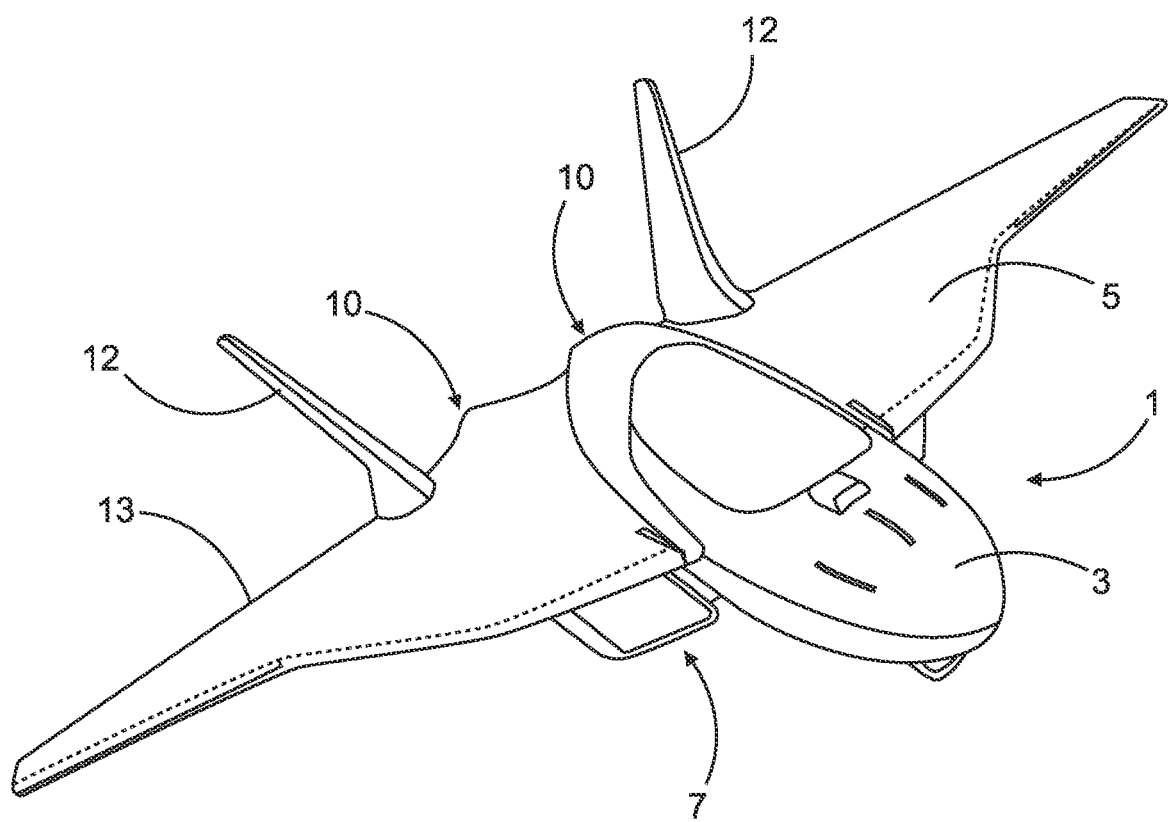
FIG. 1 shows a schematic representation of an aircraft.

FIG. 1 shows an aircraft 1 in the form of a jet aircraft with two engines. It should be understood that the reference to an aircraft always means that the corresponding statement can also refer to an aircraft in general.

The aircraft 1 has a fuselage 3 with wings 5 arranged laterally thereon. In addition, the aircraft 1 also has control surfaces (tailplane, vertical stabilizer, landing flaps, etc.) which are arranged on the fuselage or the wings. The vertical stabilizers 12 and the tailplane 13 on the rear edge of the wings 5 are shown here by way of example.

Air inlet openings 7 are arranged on the fuselage, typically laterally on the fuselage and below the wings 5. However, it should be understood that the positioning of the air inlet openings is only shown here as an example and is not decisive for the design of the described air inlet device.

The air inlet openings 7 draw in air from the environment and pass it on to, among other things, the engine 10 or engines 10. The air is guided from the air inlet opening 7 via a duct to the engine 10 or its first compressor stage.

In order to keep the radar signature of an aircraft low, various measures are sometimes taken. One of these is to avoid a direct line of sight, from the front, of the engine and its first compressor stage, because the engine or its first compressor stage is a very strong reflector for radar signals. Such measures concerning the air inlet opening 7 serve as camouflage against radar reconnaissance from the front. Other measures include shaping the outer contour of the aircraft according to certain design principles (long edges, parallel edges and surfaces, as already described above).

The focus of this description is on the design of the tail of the aircraft 1, which is such as to reduce a radar signature of the tail and engine outlets.

FIG. 1 shows an aircraft with two engines 10. It can be seen that the upper surface of the fuselage is a multi-curved surface, resulting from the presence of the two engines and two engine outlets at the tail of the aircraft.

Figure 2:
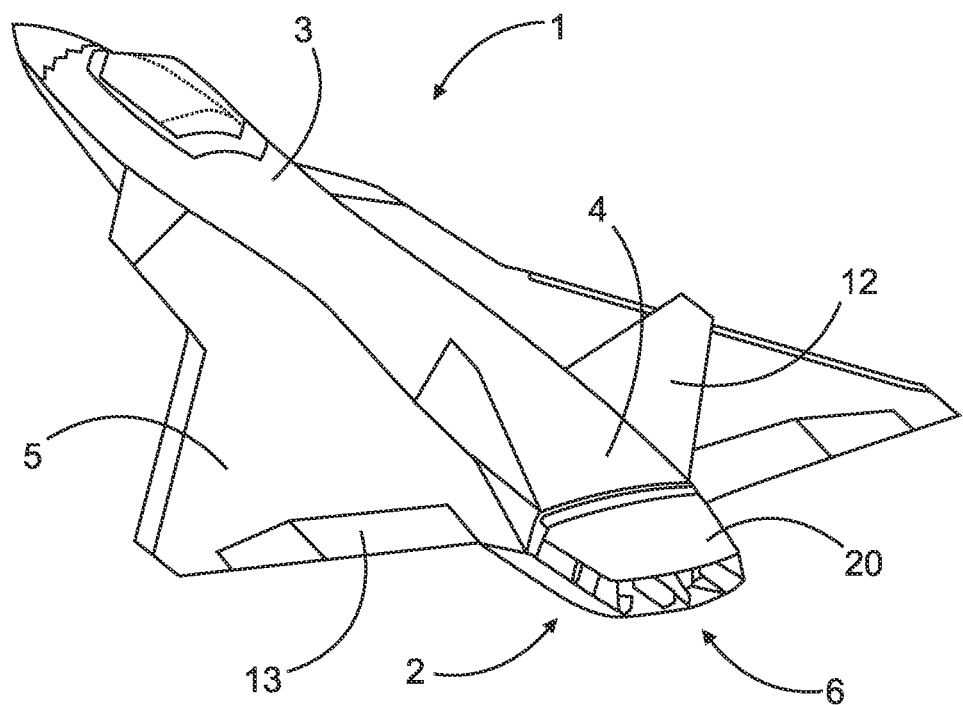
FIG. 2 shows a schematic representation of an aircraft with a fuselage constructed according to the principles described herein.

FIG. 2 shows an aircraft 1 with a fuselage 3 of which the rear end 2 is designed according to the principles described here.

A control element 20 with an integrated thrust vectoring nozzle adjoins the rear end of the fuselage 3. The aircraft 1 is basically similar in construction to the aircraft 1 from FIG. 1. FIG. 2 differs from FIG. 1 only in the use of the control element 20 and some further adjustments to the shape of the fuselage 3. While the surface of the fuselage 3 in FIG. 1 assumes a multiple curved shape at the top side of the fuselage to transition into the shape of the engine outlets 10, in FIG. 2 the fuselage 3 has a nearly flat and at most slightly curved upper surface at the outer skin 4. Thus, by using the control element 20, the outer skin 4 can be designed to be largely flat and level instead of containing multiple curved portions as in FIG. 1. Similarly, the fuselage 3 of FIG. 2 can be made flat and level on the underside of the fuselage, as also shown and described on the outer skin 4 for the upper surface.

The vertical stabilizer 12 guides an airflow along the upper surface of the fuselage to the control element 20, so that the control element with its upper control surface can function as a tailplane and generate a moment about a transverse axis of the fuselage (so-called pitching motion). The same applies to the lower surface of the fuselage, which guides an airflow to the lower control surface of control element 20. Thus, the control element 20 has a good aerodynamic effect when used as a tailplane and deflected from its initial state shown in FIG. 2.

The wings 5 can have further control surfaces 13 at their trailing edge. These control surfaces 13 can be used as landing flaps, for example. However, the control surfaces 13 can also additionally function as a tailplane if a stronger moment about the transverse axis of the fuselage 3 must be generated in a special manoeuvre. Furthermore, the control surfaces 13 can be used to generate a moment about the longitudinal axis of the fuselage (so-called rolling motion), for example by deflecting a control surface 13 on one wing upwards and a control surface of the other wing downwards. FIG. 2 also shows that the outer contour of the fuselage transitions seamlessly into the outer contour of the control element 20 and that the control element 20 has very few edges and surfaces visible from the outside (compared to a round nozzle with a plurality of plates arranged movably in the circumferential direction of the round nozzle).

Figure 3:
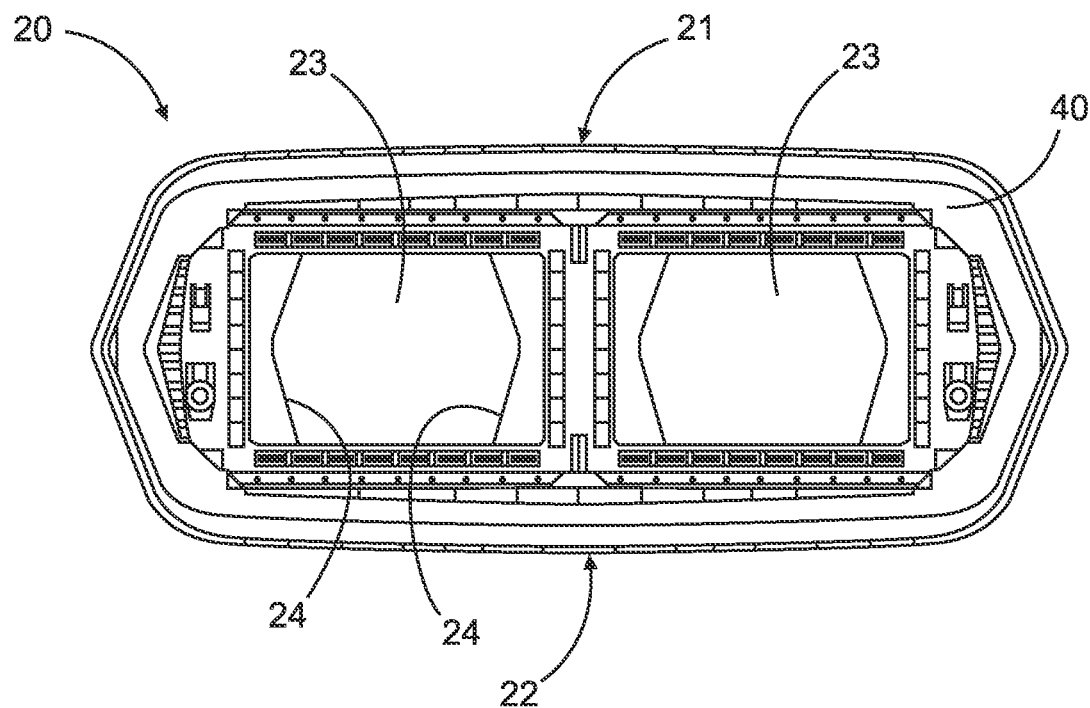
FIG. 3 shows a schematic representation of a control element with integrated engine outlet.

FIG. 3 shows a rear view of the control element 20. The control element 20 has an outer wall 40 which surrounds the elements of the control element in the circumferential direction. The control element 20 has an upper control surface 21 and a lower control surface 22. The engine outlets 23 can be seen as rear openings of the engine nozzle. The engine outlets 23 are each laterally bounded by two nozzle control blades 24. The nozzle control blades 24 are pivotable so that a cross-section of the rear opening of the engine outlets 23 can be changed by moving the nozzle control blades 24 towards or away from each other.

The nozzle control blades 24 are angled and their upper and lower edges meet the upper and lower portions of the outer wall 40 at an angle different from 90°. In particular, the nozzle control blades 24 are angled at such an angle that they correspond to the angle of the lateral portion of the outer surface of the outer wall to comply with the design principle of the edges being parallel to each other.

Figure 4:
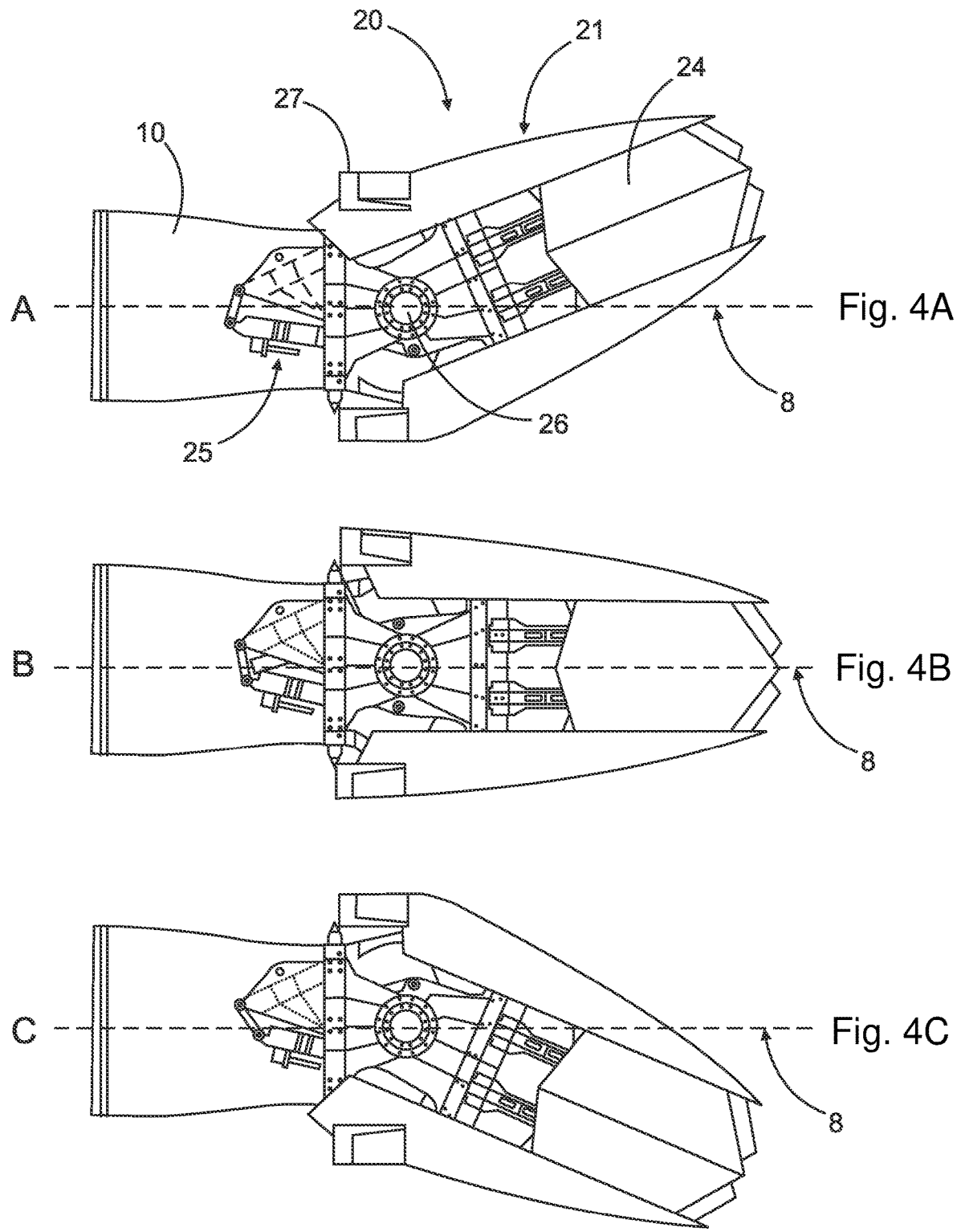
FIGS. 4A, 4B, and 4C show a schematic representation of a control element with integrated engine outlet, wherein the control element is shown in various positions.

FIGS. 4A, 4B, and 4C each show a respective side view of the control element 20 and a portion of the engine 10 that transitions into the control element 20. The fuselage surrounding the engine 10 is not shown in FIGS. 4A, 4B, and 4C. FIGS. 4A, 4B, and 4C show the control element 20 in three different states, respectively, with FIG. 4A showing the control element 20 in state A, FIG. 4B showing the control element 20 in state B, and FIG. 4C showing the control element 20 in state C.

The initial state of the control element 20 can be referred to as state B. The control element 20 is oriented so that it is parallel to the longitudinal direction 8 or longitudinal axis of the fuselage. In this state, no moment about the transverse axis is generated by the control element 20 during operation of the aircraft.

From the initial state B, the control element 20 can be moved upwards (state A) or downwards (state C), more specifically with the aid of an actuator 25, which receives an actuation signal from a flight control computer, wherein the actuation signal is output from an autopilot or a control element operated by a human pilot. The actuator 25 applies a force to the control element 20 so that the control element 20 performs a pivoting movement about the rotation axis 26. Although only one actuator 25 is shown in FIGS. 4A, 4B, and 4C, it should be understood that, for redundancy reasons, more than one actuator together with associated mechanism may be provided in order to change the position of the control element 20.

In state A, the air flowing over the upper control surface 21 generates a moment which rotates the fuselage about its transverse axis. When the control element 20 is moved to state A, the upper surface 21 slides on the fuselage side under a shell surface 27 and the lower control surface is still covered by the shell surface 27, so that no opening is created in the outer skin of the aircraft when the control surface 20 is moved from the initial state B to a deflected state A, C. The same applies for the upper and lower control surfaces of control element 20 in state C.

The shell surface 27 can be part of the fuselage 3 or part of the control element 20. In any case, the shell surface 27 does not move about the rotation axis 26, but is static with respect to the fuselage. The upper and lower control surfaces 21, 22 of the control element slide under the shell surface or are pulled out from under it when the control element 20 performs its pivoting movement about the rotation axis 26.

In FIGS. 4A, 4B, and 4C, the lateral portions of the outer wall are not visible, so as to allow a view of the actuator 25, the rotation axis 26, and the nozzle control blades 24. However, it should be understood that these elements are hidden by the outer wall when the aircraft is in operation.

Figure 5:
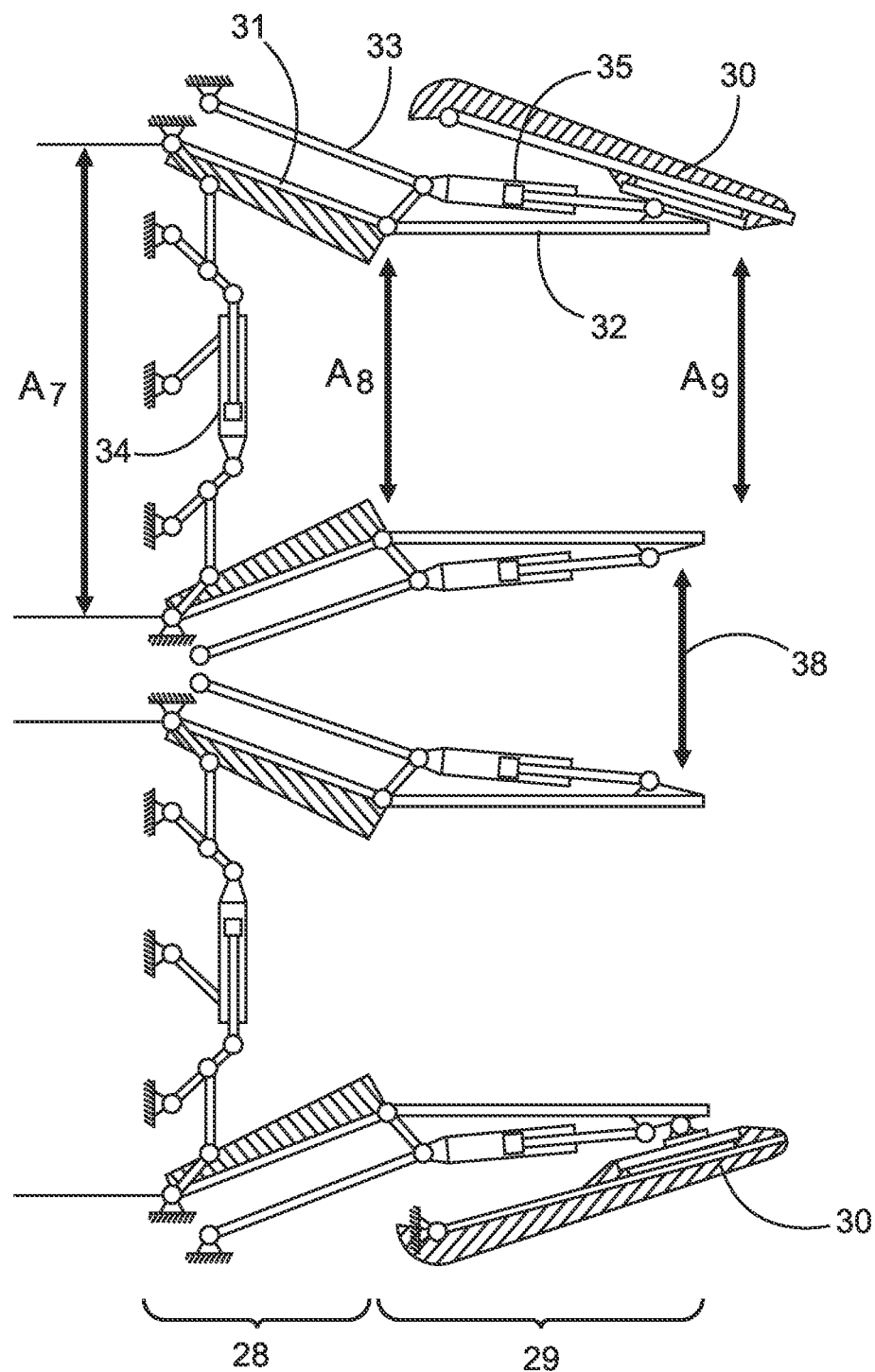
FIG. 5 shows a schematic representation of the convergent and divergent nozzle portion of the engine outlet.

FIG. 5 shows a schematic representation of the engine outlet in plan view with the convergent nozzle portion 28 and the divergent nozzle portion 29. The engine outlet is covered laterally by the nozzle covers 30.

In FIG. 5, two engine outlets are shown, similarly to FIGS. 2 and 3. It should be recognized, however, that the principles described here can be used for a single engine or multiple engines.

A control element 20 as described herein can also be provided separately for one engine in each case. If these two engines are at a certain distance from a central axis of the fuselage, then by two control elements, which are separated and spaced from each other, a torque about the longitudinal axis (roll) of the fuselage can also be generated via a separate actuation, for example by deflecting one control element upwards and the other control element downwards.

With reference to the upper engine in FIG. 5, the details of the convergent nozzle portion 28 and of the divergent nozzle portion 29 are explained. The convergent nozzle portion 28 is formed by two mutually opposed control blades 31. These taper conically towards the outlet opening (to the right), i.e. the cross-section of the nozzle is reduced in the convergent nozzle portion. An actuator 34 is connected to the control blades 31 via connecting rods and is designed to move the control blades 31 so that a ratio of the cross-section $A_7$ (inlet side of the convergent nozzle portion) to the cross-section $A_8$ (outlet side of the convergent nozzle portion) can be varied. In addition, an actuator 35 is connected to the control blades 32 of the divergent nozzle portion 29 and is configured to move the control blades 32 in order to vary a ratio of the cross-section $A_8$ (inlet side of the divergent nozzle portion) to the cross-section $A_9$ (outlet side of the divergent nozzle portion).

The actuator 35 for the divergent nozzle portion 29 is connected to the control blades 31 and the outer wall of the control element via connecting rods 33. Thus, the control blades 32 of the divergent nozzle portion 29 are entrained when the control blades 31 of the convergent nozzle portion 28 are moved.

Even though the control blades 32 of the divergent nozzle portion 29 in FIG. 5 run parallel to each other, these control blades 32 can assume different positions with respect to each other and with respect to the control element. The control blades 32 can be brought into a position such that the cross-section $A_9$ is larger than the cross-section $A_8$. The control blades 32 of both engine outlets can both be pivoted laterally at the same time in the same direction or in different directions (in the illustration of FIG. 5 upwards or downwards, i.e. in the direction of a nozzle cover). If both control blades 32 of both engine outlets are pivoted jointly and simultaneously in the direction of the upper or lower nozzle cover 30, this generates a moment about the vertical axis of the aircraft (yaw movement). If the two control blades 32 of the upper engine outlet are swung out laterally in a first direction (away from the central axis of the fuselage) and the two control blades 32 of the lower engine outlet are swung out laterally in the other direction, opposite to the first direction, such that a distance 38 between the inner control blades 32 is increased or maximized, a braking effect can be generated. The control surfaces 32 of the divergent nozzle portion 29 can also be deflected so that a distance 38 between the inner control blades 32 becomes minimal. This reduced distance between the two engine outlets also reduces the radar signature.

Figure 6:
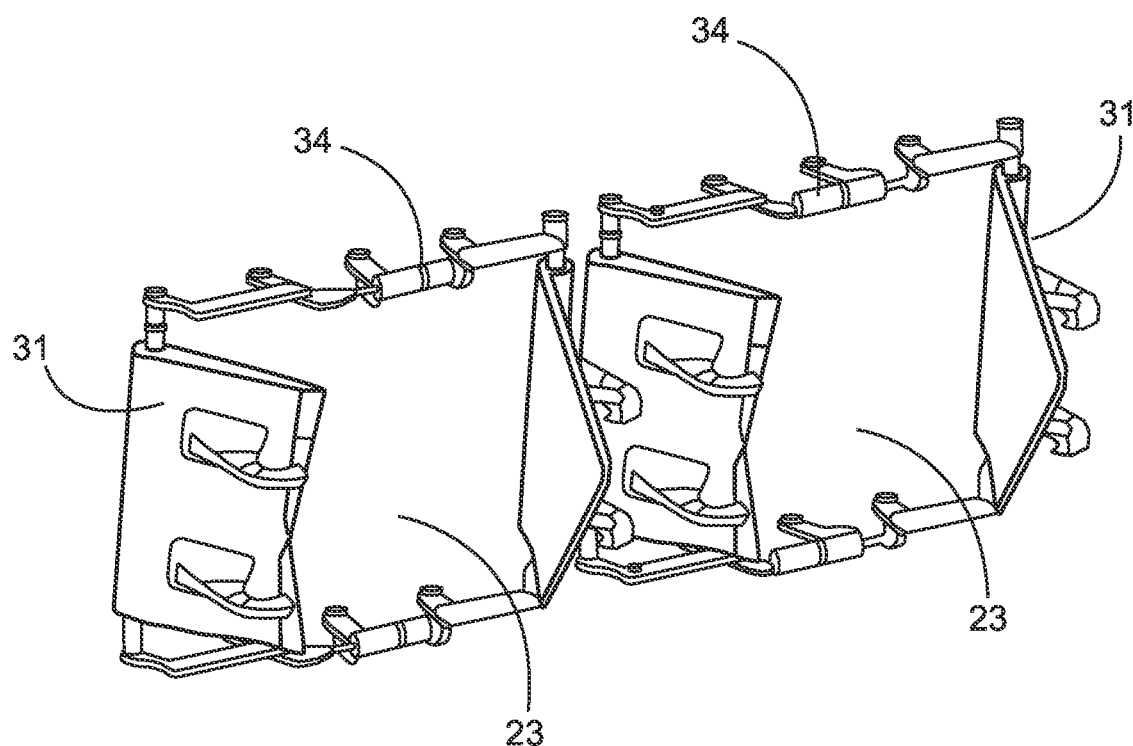
FIG. 6 shows a schematic representation of the convergent portion of the engine outlet.

FIG. 6 shows a schematic isometric representation of the control blades 31 of the convergent nozzle portion 29. In the example of FIG. 6, two pairs of control blades 31 are shown, wherein one pair of control blades 31 is associated with one power unit in each case. The control blades 31 of an engine are moved towards each other by the actuator 34 via a linkage or a gearing in such a way that the ratio of the cross-sections $A_7$ and $A_8$ shown in FIG. 5 is varied. The actuators 34 are controlled by a flight control computer.

All actuators 25, 34, 35 described herein can be designed as hydraulic, electric or electrohydraulic drives. The actuators generate a movement that is transmitted to an element to be moved by a mechanism, for example in the form of a linkage and/or gearing. The actuators can perform a linear movement or a rotary movement.

Figure 7:
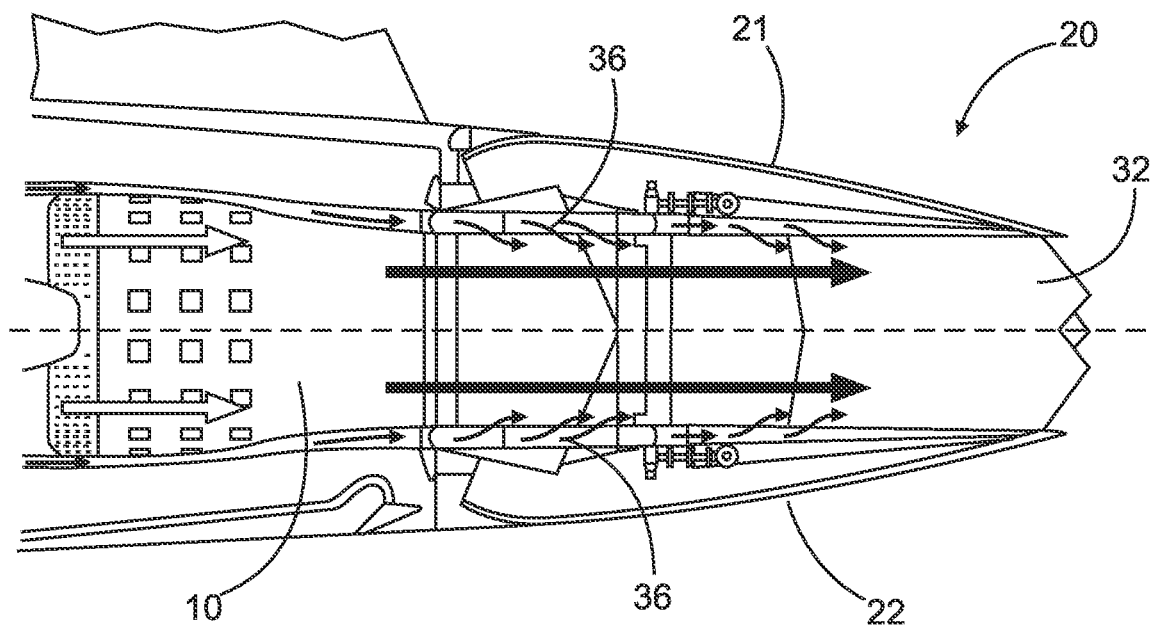
FIG. 7 shows a schematic representation of the engine outlet with a cavity for cooling air flowing past.

FIG. 7 shows a schematic cross-sectional representation of the engine 10 and of the control element 20. In FIG. 7 the control element 20 is shown without deflection about the rotation axis, i.e., in the same state as in FIG. 4B. This means that the upper control surface 21 and the lower control surface 22 do not deflect air flowing along the outer skin of the fuselage and thus do not generate a moment about the transverse axis of the aircraft.

As can be seen from FIG. 7, a trailing edge of the control blades 32 of the divergent nozzle portion is zig-zag-shaped and does not form a single, continuous, straight breakaway edge. This increases the effective length of the entire trailing edge and also ensures that the hot exhaust gases from the engine are better mixed with the ambient air to reduce a heat signature of the aircraft.

The outer wall of the engine 10 is double-walled with a cooling air duct 36. In the cooling air duct 36, cool air from the environment flows along the longitudinal axis of the engine towards the engine outlet. This air cools the engine. In the region of the convergent nozzle portion and the associated control blades, the cooling air from the cooling air duct 36 flows inwards, for example through openings in the inner wall of the cooling air duct. The cool air from the cooling air duct can mix with the hot exhaust gases of the engine at this point and can cool the exhaust gases. Due to the pressure and flow conditions in the engine outlet, the air exiting the cooling air duct flows close to the wall of the engine outlet towards the outlet opening. Therefore, the cool air also flows along the control blades 32 of the divergent nozzle portion and cools them as well.

Figure 8A:
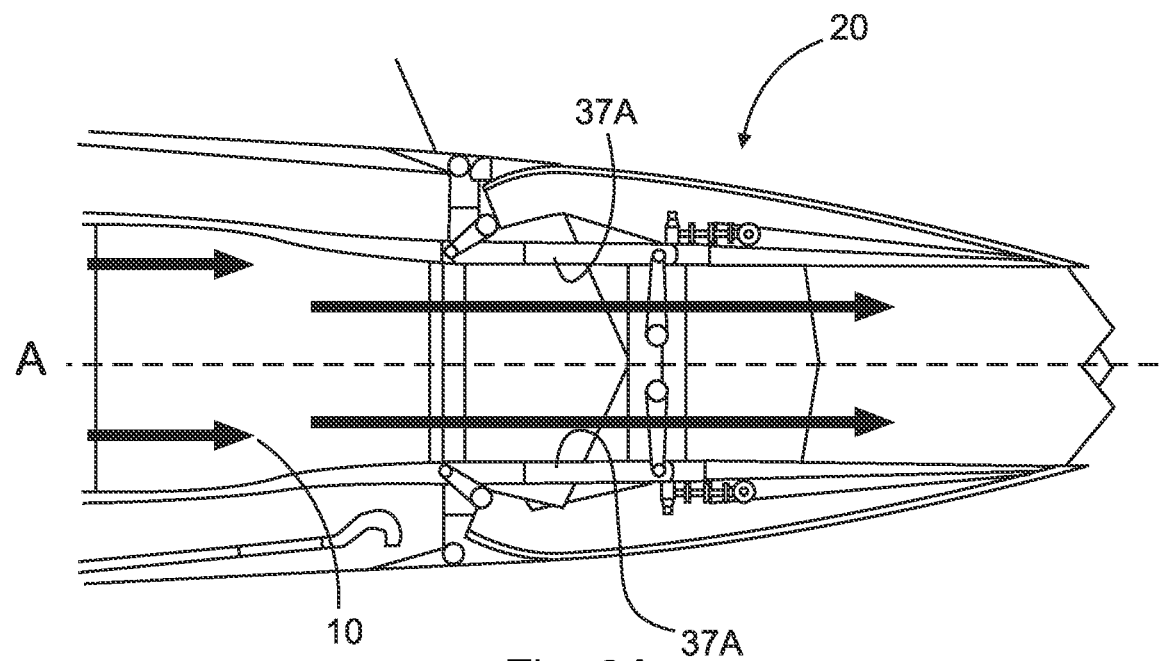
FIGS. 8A and 8B show a schematic representation of the engine outlet with a thrust reversal device in different respective operating states.
Figure 8B:
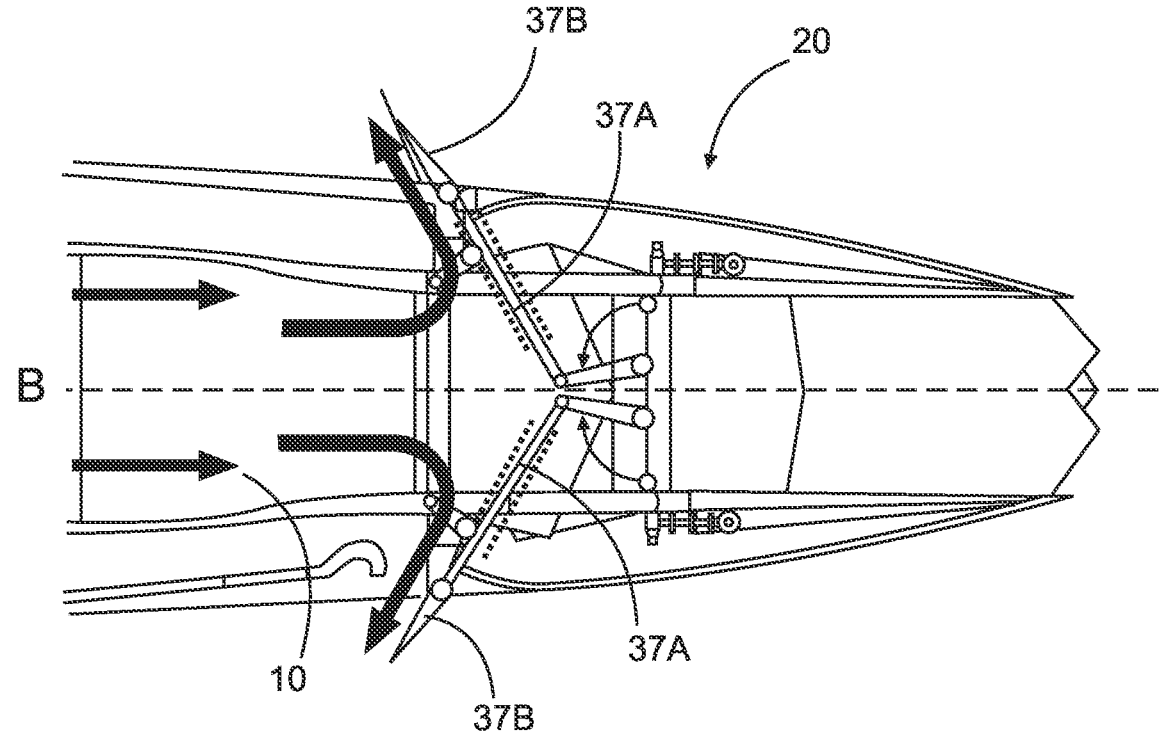

FIGS. 8A and 8B show another function of the engine 10. In state A, which is shown in FIG. 8A, the engine is shown as also shown in FIG. 7 above, i.e. without deflection of the control element 20 about the rotation axis.

However, the engine 10 is extended by two inner deflector plates 37A (and an associated drive, for example in the form of an actuator/motor together with gearing and linkage) which can be moved towards each other from below and above to redirect the engine exhaust flow so as to effect a thrust reversal.

The thrust reversal state (state B) is shown in FIG. 8B. The inner deflector plates 37A are pivoted one downwards and one upwards and rest against each other in such a way that they block the path of the engine exhaust gases to the rear outlet opening and redirect the exhaust gases upwards and downwards respectively, as illustrated by the two arrows.

When the inner deflector plates 37A are pivoted from state A of FIG. 8A to state B of FIG. 8B, openings on the outer walls of the engine are released by pivoting outer deflector plates 37B from a closed position (state A) to an open position (state B), releasing the exhaust gases from the aircraft against the direction of flight. The openings closed or released by the outer deflector plates 37B are located in front of the inner deflector plates 37A. Thus, the deflector plates 37A, 37B effect a thrust reversal.

While at least one example embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. Reference signs in the claims are not to be regarded as a limitation.

LIST OF REFERENCE SIGNS

1 Aircraft
2. Rear end
3 Fuselage
4 Outer skin
5 Wings
6 Rear side
7 Air inlet opening
8 Longitudinal direction
9 Air inlet duct
10 Engine
12 Vertical stabilizer
13 Control surfaces
20 Control element with integrated thrust vectoring nozzle
21 Upper control surface
22 Lower control surface
23 Engine outlet, engine nozzle
24 Nozzle control blade
25 Actuator
26 Rotation axis
27 Shell surface
28 Convergent nozzle portion
29 Divergent nozzle portion 30 Nozzle cover
31 Control blade of the convergent nozzle portion
32 Control blade of the divergent nozzle portion
33 Connecting rod
34 Actuator of the convergent nozzle portion
35 Actuator of the divergent nozzle portion
36 Cooling air duct
37 Deflector plates
38 Distance
40 Outer wall

The invention claimed is:

1. A fuselage for an aircraft, the fuselage comprising:
a shell surface; and
a control element with an integrated engine outlet;
wherein the control element is integrated at a rear end of the fuselage and is a rearward extension of the fuselage in a longitudinal direction of the fuselage, so that the control element terminates flush with an outer skin of the fuselage in a circumferential direction of the fuselage;
wherein an outer wall of the control element surrounds the engine outlet, such that the engine outlet is directed towards an open rear side of the control element;
wherein the fuselage transitions into the control element at a transition point, the fuselage and the control element having similar cross-sections at the transition point and, at the transition point, the width and height of the control element correspond to the width and height, respectively, of the fuselage;
wherein the control element is connected to the fuselage such that the control element is pivotable together with the engine outlet about a rotation axis with respect to the fuselage;
wherein the rotation axis runs transversely to the longitudinal direction of the fuselage and the control element functions as a tailplane when pivoting about the rotation axis;
wherein the shell surface is static with respect to the fuselage and does not pivot about the rotation axis;
wherein the control element is configured to be moved upwardly, from an initial state, to an upward state and moved downwardly, from the initial state, to a downward state;
wherein the control element includes an upper control surface and a lower control surface;
wherein, when the control element is moved to the upward state, the upper control surface is configured to slide under the shell surface and the lower control surface is covered by the shell surface;
wherein, when the control element is moved to the downward state, the lower control surface is configured to slide under the shell surface and the upper control surface is covered by the shell surface;
wherein the engine outlet has a convergent nozzle portion and a divergent nozzle portion arranged therebehind in the longitudinal direction;
wherein the divergent nozzle portion has two control blades; and
wherein adjusting of the two control blades of the divergent nozzle portion in the same direction generates a moment about a vertical axis of the aircraft resulting in a yaw movement of the aircraft.

2. The fuselage according to claim 1, wherein the engine outlet is a thrust vectoring nozzle.

3. The fuselage according to claim 1, wherein the convergent nozzle portion has two control blades which are adjustable relative to each other so that a cross-section of the convergent nozzle portion is variable.

4. The fuselage according to claim 1, wherein: the two control blades of the divergent nozzle portion are adjustable relative to each other, so that a cross-section of the divergent nozzle portion is variable; or the two control blades of the divergent nozzle portion are adjustable jointly, so that a cross-section of the divergent nozzle portion remains same and an outlet direction of the engine outlet is changed.

5. The fuselage according to claim 4, wherein the cross-section of the convergent nozzle portion is variable independently of the cross-section of the divergent nozzle portion.

6. The fuselage according to claim 4, wherein the two control blades of the divergent nozzle portion are angled and each of the two control blades of the divergent nozzle portion meets the outer wall of the control element at an angle different from 90°.

7. The fuselage according to claim 4, wherein a rear edge of the two control blades of the divergent nozzle portion is serrated.

8. The fuselage according to claim 4, wherein:
the control element has a lateral nozzle cover on both sides; and
each lateral nozzle cover is connected to a respective one of the two control blades of the divergent nozzle portion and is entrained by the respective one of the two control blades of the divergent nozzle portion when the respective one of the two control blades of the divergent nozzle portion moves.

9. The fuselage according to claim 1, wherein the engine outlet is double-walled, at least in portions, so that a cooling flow can be guided through the double-walled portion.

* * * * *